United States Patent [19]

Cook, Jr.

[11] 4,077,576
[45] Mar. 7, 1978

[54] MACHINE FOR CONTINUOUS GLASS FILAMENT WINDING OF LARGE BONDED FIBERGLASS STRUCTURES, SUCH AS CRYOGENIC TANKS FOR LIQUID NATURAL GAS

[76] Inventor: William H. Cook, Jr., 875 SE. Shoreland Dr., Bellevue, Wash. 98004

[21] Appl. No.: 755,817

[22] Filed: Dec. 30, 1976

[51] Int. Cl.² ............................................. B65H 54/64
[52] U.S. Cl. ............................................. 242/3; 242/2
[58] Field of Search ............... 242/2, 3; 156/186, 170, 156/189, 180, 446

[56] References Cited

U.S. PATENT DOCUMENTS

| | | | |
|---|---|---|---|
| 1,546,424 | 7/1925 | Wood | 242/3 X |
| 3,923,573 | 12/1975 | Hoy | 156/186 X |
| 3,951,349 | 4/1976 | Christensen | 242/3 |

Primary Examiner—Edward J. McCarthy
Attorney, Agent, or Firm—Roy E. Mattern, Jr.; David H. Deits; Kenneth S. Kessler

[57] ABSTRACT

A winding machine for the continuous glass filament winding of bonded fiberglass structures, such as cryogenic tanks for liquid natural gas, often referred to as LNG tanks, comprises, a hemispherical male mold mounted on a turntable, a half circular track which rotates over the male mold about a horizontal axis, a carriage which moves along the inside of the half circular track, and a bobbin wound with fiberglass tape secured to the carriage, whereby, the combined motions of the turntable, track and carriage are coordinated by numerical control, to produce a desired winding pattern to completely cover the hemisphere in manufacturing bonded fiberglass structures and parts thereof.

2 Claims, 5 Drawing Figures

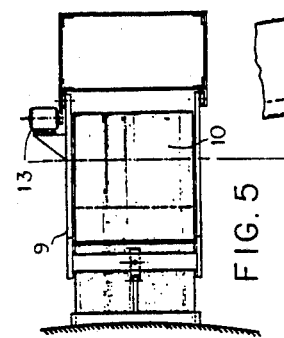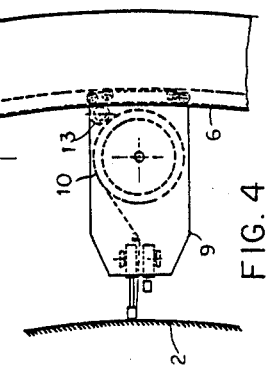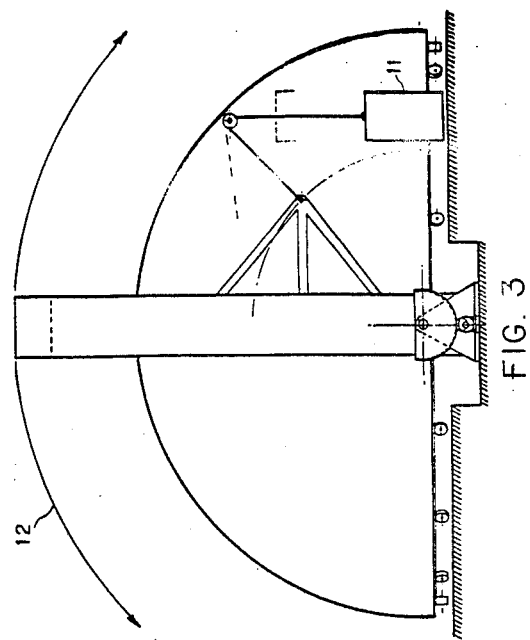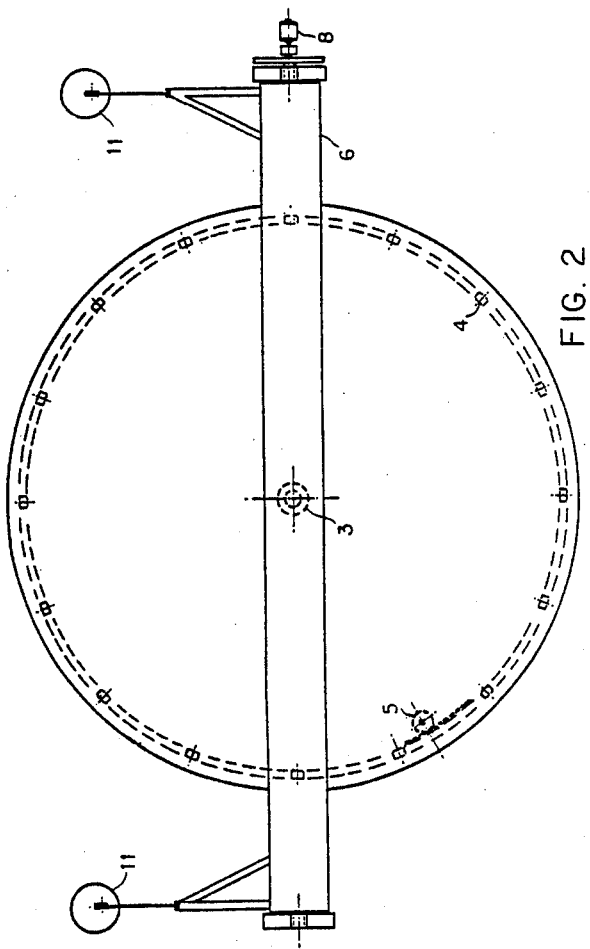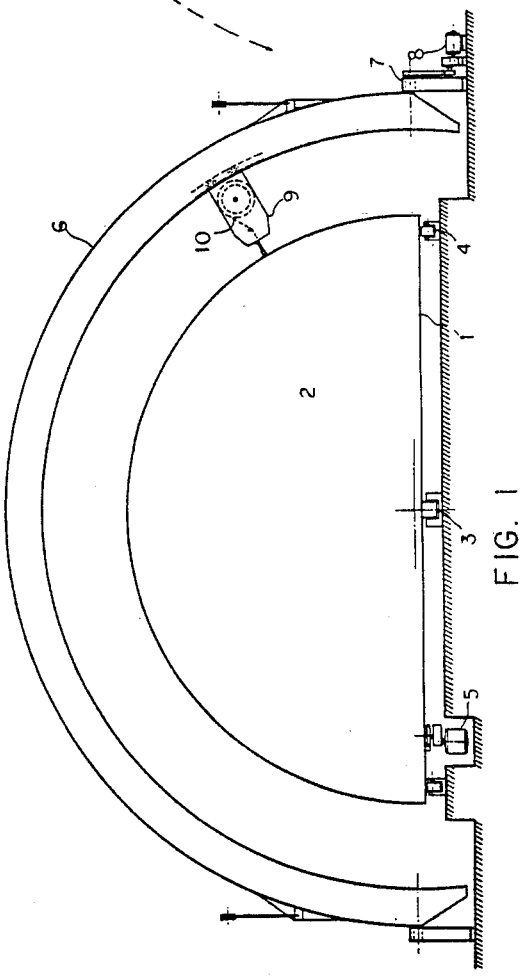

MACHINE FOR CONTINUOUS GLASS FILAMENT WINDING OF LARGE BONDED FIBERGLASS STRUCTURES, SUCH AS CRYOGENIC TANKS FOR LIQUID NATURAL GAS

BACKGROUND OF THE INVENTION

Large fiberglass boats and other fiberglass structures have been and are being made by following the hand layup procedures used in placing layers of fiberglass cloth, bonded with resin over a mold. While such hand layup structures have been and are satisfactory for many products, there are potentially other products such as liquid natural gas tanks, wherein a more efficient use of fiberglass requires uniform tensioning of the fibers, and their orientation in the direction of the stresses. Moreover, the use of continuous fibers in a machine wound structure greatly reduces the dependence upon the resin to transfer loads through shear. In addition overlaps of fiberglass, as are required when small pieces of fiberglass material are used, are eliminated, when a machine wound structure is being manufactured. The machine windings over a mold result in structures that are of higher quality, lighter, and amenable to accurate stress analysis.

For these reasons smaller high pressure tanks and rocket cases have been previously wound from fibers. These smaller tanks have been and are being made in one piece, using a male mold that is extracted through a filler hole. These smaller winding machines usually have a fixed base for the fiberglass supply system, and the mold rotates about two axes to generate a desired winding pattern to form the fiberglass tank. In regard to these smaller high pressure tanks, the stresses due to internal pressure, are so high relative to those imposed by the weight of the tank, that the tank is mounted on a saddle without using any mounting fittings previously built into a tank.

Conversely, very large tanks, over 100 inches in diameter, which operate at low pressures, with the principal load being due to the mass of the contents, have relatively thin tank walls in comparison to their diameter, and act mostly like a membrane. A horizontal equator mounting of these large LNG spherical tanks is undertaken. Moreover these LNG tanks result from using a new type of winding machine, which builds large hemispherical halves of the LNG tanks, using a mold which pivots about one axis, rather than about two axes, as often occurs when small tanks are being manufactured.

SUMMARY OF THE INVENTION

To wind a large fiberglass hemisphere such as half of a LNG tank, a male mold is movably mounted on a horizontal turntable. During the manufacture of a hemisphere, the mold is machine wrapped with a fiberglass tape which unwinds from a bobbin that moves over the mold on a circular track, which in turn is pivoted about a horizontal axis located in the plane of the horizontal turntable. The direction of the wrapping is on or close to a great circle, as known in navigational terms. If the direction were otherwise, the tape under tension would slide off the spherical surface of the male mold. In covering the hemisphere to provide the thickness of the fiberglass in proportion to the stresses, and in orienting the glass fibers in the direction of the major stresses, the track on which the bobbin moves varies from a perpendicular angular position over the so called north pole of the hemispheric male mold, to a level or flat angular position near the ecliptic of this male mold.

The rotational horizontal movement of the turntable, the circular angular track movement, and the carriage movement with bobbin on the track, are all coordinated through numerical control. This overall continuous glass filament winding machine includes many mechanical, hydraulic, and electrical components, which are also included in other machine tools.

DESCRIPTION OF DRAWINGS

FIG. 1 is a side view of the machine for the continuous glass filament winding of large bonded fiberglass structures such as cryogenic tanks for liquid natural gas, showing a turntable, a hemispherical mold, a turntable pivot, supporting rollers, a drive motor, a circular track, pivots for the track, a track inclination drive motor, a carriage and a bobbin;

FIG. 2 is a top view of the machine illustrated in FIG. 1, showing the same components, and in addition counter-weights which are effective upon pivoting the track;

FIG. 3 is a side view of the machine illustrated in FIGS. 1 and 2, indicating the motion of the frame and also the counter-weights; and FIGS. 4 and 5 in partial side and top respective enlarged views, show the carriage, the bobbin, and the drive motor for moving the carriage on the track.

DESCRIPTION OF PREFERRED EMBODIMENT

Winding a surface requires motion in two directions, or in the case of a body of revolution, rotation about two axes. In making very large bodies of revolution, such as a 100 foot diameter hemisphere to become part of a cryogenic LNG tank, a mold is so heavy, that it is preferable to rotate it only about one axis, while a bobbin from which the filament unwinds moves around the other axis. While it would be possible to have the mold stationary, and mount the bobbin on a gimbaled frame so as to move the bobbin about both axes, there would have to be numerous electrical, hydraulic power, and control leads to the bobbin drive, creating many impractical complications.

Therefore, the male mold 2, is mounted on a turntable 1, and supporting rollers 4 and a turntable pivot 3, while the drive motor 5 and its table position sensor can be stationary. The bobbin 10 is mounted in a carriage 9 which is powered by motor 13 to roll on a semicircular track 6, which is pivoted about a horizontal axis by track inclinator motor 8 against counter weights 11, to vary its position from polar, as shown in FIGS. 1, 2 and 3, and motion arrow 12 to one that is near that of the earth's ecliptic.

The requirements of the winding pattern are that (1) it cover the male mold or hemisphere to form one half of the LNG tank, (2) the thickness and direction of the filaments be such as to best utilize the material, and such as fiberglass tape, in resisting the loads, so that the filaments or tapes are stressed as nearly uniform as possible; (3) that the path of the bobbin 10 as it moves over the hemisphere surface be on a great circle or be sufficiently close to a great circle, so the tape or filament of fiberglass does not slide off the surface when the resin used for bonding is still in a viscous, and therefore lubricating, stage. The bobbin 10 should move in what can be called a "progressive" great circle. The actual winding pattern used will result from an integration of the stress requirements with the practicality of maintaining an even filament or tape tension. Numerical control is essential for uniformity, quality, and low cost.

In the past numerical control has been used to control two motions, namely the rotation of the mandrel about two axes, or the rotation about one axis and translation in one direction. However in this invention there are three independent motions that must be coordinated to develop the winding pattern: namely, the rotation of the mold 2 about the central turntable pivot 3; the rotation of the half circular track 6 about the pivots 7; and the motion of the carriage 9 along the half circular track 6.

I claim:

1. A machine for the continuous fiberglass filament or tape winding of large hemispheres to be used in pairs for tanks, comprising:
   a. a male hemispheric mold or the like;
   b. a horizontal turntable rotating about a vertical pivot axis to rotate the male mold to be wrapped with fiberglass filaments, made up into a tape;
   c. a bobbin, to distribute the fiberglass tape over the surface of the male hemisphere mold at or close to a great circle path.

2. A machine for the continuous winding of a fiberglass filament or tape, as claimed in claim 1, comprising in addition a swinging semicircular track, pivoted about a horizontal axis located in the plane of the horizontal turntable and a carriage that moves on the swinging semicircular tank and supports the bobbin.

* * * * *